R. W. CAMPBELL.
CHAIN FASTENER.
APPLICATION FILED MAR. 31, 1921.
1,412,919.
Patented Apr. 18, 1922.
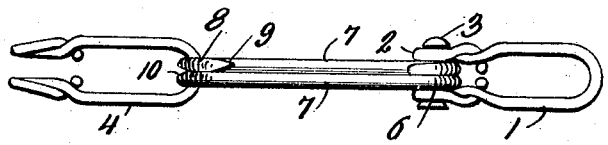
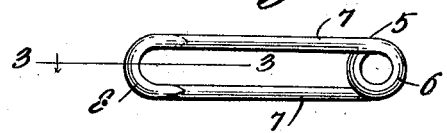
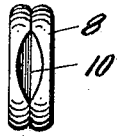
WITNESSES
RAYMOND W. CAMPBELL INVENTOR.
BY
ATTORNEY.

UNITED STATES PATENT OFFICE.

RAYMOND W. CAMPBELL, OF HUNTSVILLE, ILLINOIS.

CHAIN FASTENER.

1,412,919.  Specification of Letters Patent.  Patented Apr. 18, 1922.

Application filed March 31, 1921. Serial No. 457,330.

*To all whom it may concern:*

Be it known that I, RAYMOND W. CAMPBELL, a citizen of the United States, residing at Huntsville, in the county of Schuyler and State of Illinois, have invented certain new and useful Improvements in a Chain Fastener, of which the following is a specification.

This invention relates to a chain fastener which is especially adapted to be used for fastening the ends of the longitudinal chains on non-skid devices and has for its principal object to generally improve upon fasteners of this character by providing a device which will be of extremely simple, durable and inexpensive construction, one which is efficient and reliable in operation, and well adapted to the purpose for which it is designed.

Another object of the invention is to provide a fastener of this nature which may be easily and quickly attached to or detached from the chain.

With these and numerous other objects in view, the invention resides in certain novel features of construction, and arrangement of parts as will be hereinafter fully described and claimed.

In the drawing:—

Figure 1 is a top plan view of the fastener showing same attached to a chain,

Figure 2 is a side elevation thereof,

Figure 3 is a section taken on the line 3—3 of Figure 2, and

Figure 4 is an end elevation thereof.

Referring to the drawing it will be seen that 1 designates one end link of the longitudinal chains of a non-skid device which has its ends bent so as to form the eyes 2 which register with each other for receiving the pin 3. The other end link of the longitudinal chain is designated by the numeral 4. My fastener is indicated generally by the numeral 5 and is preferably formed of a single strand of resilient wire which is bent so as to form the coil 6 having projecting therefrom the substantially parallelly extending arms 7 which terminate in the hooks 8 which extend in opposite directions from each other and are positioned so as to overlap each other and to be in snug engagement with each other. These hook ends are constructed so that their terminals extend in the same direction with the opposite arm and these terminals are pointed as is shown at 9. It will also be noted that concave indentures 10 are provided intermediate the ends of the hooked members 8 and these indentures register with each other.

When it is desired to assemble the fastener in conjunction with the tire chain the pin 3 is passed through the eyes 2 so as to pass through the opening in the coil 6 which will be disposed between the two eyes 2. The link 4 will then be twisted or turned so as to have its plane in alignment with the plane of the fastener and the end of the link 4 will be placed in engagement with the concave indentures 10 and forced between the hooked ends 8. It will be noted that the indentures 10 make this process rather easy since as the link 4 is being forced between the ends 8 it may be slightly twisted back and forth and thus pry its way between these hooked ends 8. When it is desired to disengage the link 4 with the fastener 5 it will only be necessary to slightly turn the link 4 so that its plane will be in substantial alignment with the plane of the fastener and to pull same from the fastener with a slight twist and because of the pointed ends 9 this link 4 may be easily forced between the two hooked ends 8.

From the above description it will be noted that this hook can be made strong and is efficient besides being capable of being manufactured at a comparatively small expense. It is easily operated and can be made of any required size and finish.

Having thus described my invention what I claim as new is:

As a new article of manufacture a fastener formed from a single strand of resilient wire bent so as to form a coil having substantially parallel arms extending therefrom, hook members formed on the terminals of the arms and provided with registering indentures and pointed terminals.

In testimony whereof I affix my signature in presence of two witnesses.

RAYMOND W. CAMPBELL.

Witnesses:
 CHARLES PETERS,
 SALATHIEL STONE.